Aug. 25, 1970     S. S. MAZUR     3,525,533
STEERING LINKAGE
Filed March 22, 1968
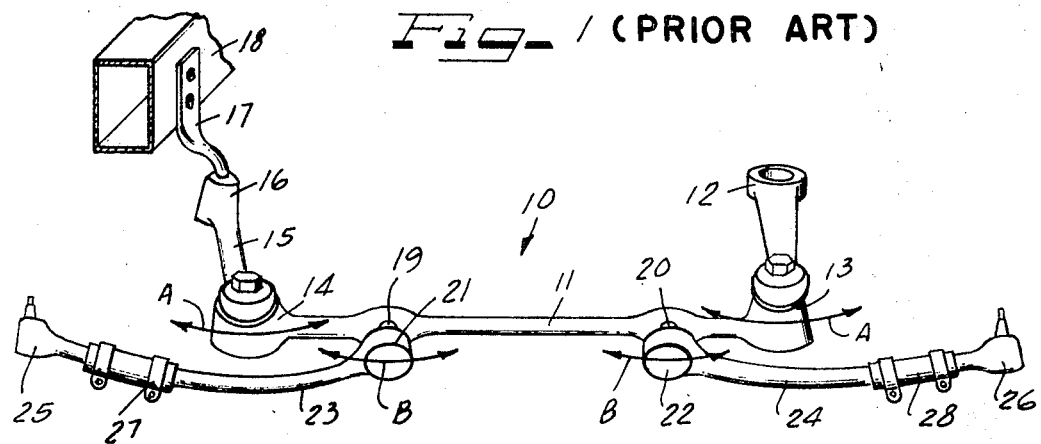
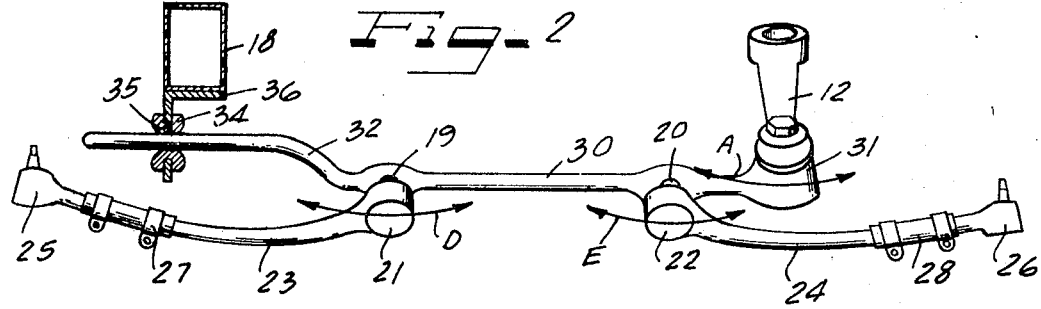
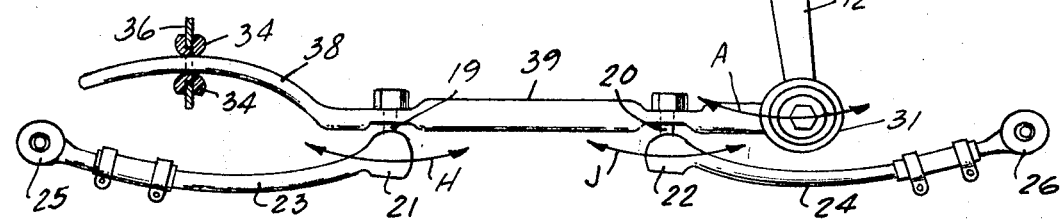
INVENTOR.
SYLVESTER S. MAZUR
BY Hill, Sherman, Meroni, Gross & Simpson     ATTORNEYS 329# United States Patent Office 3,525,533
Patented Aug. 25, 1970

3,525,533
STEERING LINKAGE
Sylvester S. Mazur, Detroit, Mich., assignor to TRW Inc., Cleveland, Ohio, a corporation of Ohio
Filed Mar. 22, 1968, Ser. No. 715,356
Int. Cl. B62d 7/16
U.S. Cl. 280—95                                                5 Claims

ABSTRACT OF THE DISCLOSURE

A steering assembly for directing the angular movement of the dirigible wheels of a vehicle from the rotary movement of the steering gear box which has a centerlink bar supported on one end by a pitman arm activated by the steering gear and on the other end by an extension of the centerlink which is received in a bushing carried by the frame of the vehicle. Tie rods are attached to the centerlink and connect the centerlink to the dirigible wheels in such a manner that shifting of the centerlink causes angular movement of the dirigible wheels.

BACKGROUND OF THE INVENTION

Field of the invention

This invention relates to steering mechanisms for vehicles, and more particularly a parallelogram steering linkage without an idler arm.

Prior art

Many forms of steering linkages for connecting the dirigible wheels of a vehicle to the steering gear of the vehicle are known to the prior art. One of such forms is commonly referred to as the "parallelogram linkage," which utilizes a centerlink attached at one end to a pitman arm which in turn is attached to the steering gear. The other end of the centerlink is usually connected to the frame of the vehicle through an idler arm. In this manner the centerlink is shifted longitudinally and transversely when the pitman arm is rotated.

Various attempts to eliminate the idler arm which requires additional ball joints have been suggested in the prior art. Such prior art attempts have usually eliminated the arcuate movement of the centerlink. (See for example the U.S. patent to Graham, No. 2,761,694.) While such prior art attempts have eliminated the idler arm and attached the transverse link directly to the frame, they have eliminated the arcuate movement of the centerlink and have required an extra joint and drag link in the connection between the centerlink and the pitman arm.

SUMMARY

My invention overcomes these difficulties by providing a standard parallelogram linkage wherein one end of the centerlink is attached to the pitman arm in the normal manner and the other end of the centerlink is attached to a bushing carried by the frame of the vehicle. The centerlink end is free to reciprocate in the bushing and the arcuate movement of the centerlink is preserved. In a modification of this invention, the end of the centerlink which projects into the bushing is arcuately curved so that the arcuate movement of the centerlink is equal at both points of the centerlink wherein the tie rods are attached. A further modification provides for stops built into the extension of the centerlink which projects through the bushing which provide effective steering limits to prevent oversteering of the vehicle.

It is then an object of this invention to provide an improved steering linkage without an idler arm.

It is a further object of this invention to provide an improved parallelogram type steering linkage having a centerlink attached to the vehicle without the use of an idler arm.

It is a further and more specific object of this invention to provide a parallelogram steering linkage having a centerlink attached to and supported by a pitman arm and having an elongated extension on the other end received through a slip bushing to provide a linkage capable of arcuate movement without an idler arm.

It is yet another and more specific object of this invention to provide a steering linkage having a centerlink attached to and supported by the pitman arm at one end thereof and having a curved extension on the other end received in a slip bushing attached to the vehicle to allow arcuate movement of the linkage which is equal at the points on the centerlink where the tie rods are attached.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a perspective front view illustrating a parallelogram steering linkage of the prior art.

FIG. 2 is a front perspective view of the parallelogram steering linkage of this invention.

FIG. 3 is a top perspective view of a modified form of the parallelogram steering linkage of this invention.

FIG. 4 is a fragmentary plan view of a modified form of the extending end of the centerlink of the steering linkage of this invention.

DESCRIPTION OF THE PREFERRED EMBODIMENTS

FIG. 1 illustrates a standard type of prior art parallelogram steering linkage 10 which has a centerlink 11 connected at one end to a pitman arm 12 through a ball joint 13. The centerlink 11 may be solid or tubular and has the ball joints provided in or attached to both ends. On the end opposite the ball joint 13 is a ball joint 14 connected to one end of an idler arm 15, the other end of which, 16, is connected to a bracket 17 suspended from the frame 18 of the vehicle thus providing a pin joint mounting.

Intermediate the ball joints 13 and 14 the centerlink 11 is connected to the studs 19 and 20 of two ball joints 21 and 22 which are formed as part of the ends of two tie rods 23 and 24. The other ends of the tie rods 23 and 24 terminate in ball joints 25 and 26 which may be attached to the dirigible wheels of a vehicle. Adjusting link clamps 27 and 28 attached to the tie rods 23 and 24 are used to adjust the effective length of the tie rods to align the wheels.

It can therefore be seen that in this type of prior art linkage, as the pitman arm 12 is rotated by the action of the steering gear, the ends of the centerlink move transversely and laterally though equal arcs. These arcs are indicated by the double-arrowed lines A. The arcs A have radii of equal lengths. The lengths of the radii are the effective movement arms of the pitman arm 12 and the idler arm 15 which are made equal.

Since the arcs A are equal, then the arcs B of the tie rod connections to the centerlink 11 are also equal. Therefore the properly aligned dirigible wheels of the vehicle connected to the joints 25 and 26 will be moved through equal arcs when the pitman arm 12 is rotated.

The use of an idler arm 15 requires the use of two joints 14 and 16 which are expensive to manufacture and require a certain amount of time for installation.

FIG. 2 illustrates one form of my invention which eliminates the need for the idler arm 15 and the joints 14 and 16. The centerlink 30 is substantially the same as the centerlink 11 and has a joint 31 equivalent to the joint 13 on one end thereof attached to the pitman arm 12. However, the other end of the centerlink 30 has an elongated extension 32 thereon in place of the link 14. The extension 32 is received in a slip bushing 34 carried by the frame 18 of the vehicle. The bushing 34 can be of any design slip bushing such as a polyurethane bushing pressed into an aperture 35 in the bracket 36 attached to the frame 18. The bushing should accommodate pivoting of the extension as it slides therethrough.

The extension 32 of the centerlink illustrated in FIG. 2 is straight in the area adapted to slip through the bushing 35. When such a straight extension is used, the centerlink 30 will still move through an arc when the pitman arm 12 is rotated. However, because rotation of the pitman arm 12 produces only linear movement through the bushing 35, the arcs D and E of the tie rods 23 and 24 will have a slight difference. The amount of difference is determined by the degree of the arc A produced at the joint 31 connecting the centerlink 30 to the pitman arm 12 and the distance along the centerlink separating the studs 19 and 20. In any event, the arc D will have a longer radius than the arc E. In some vehicles the slight difference in steering caused by this will not be that disadvantageous.

However, FIG. 3 shows a modification of my invention which substantially corrects the differences in arcs at the studs 19 and 20. In this embodiment, the extension 38 of the centerlink 39, which in all other respects is equivalent to the centerlink 30, is arcuately curved by a large radius curvature toward the side of the centerlink 39 from which the tie rods 23 and 24 project. The curvature of the extension 38 thus allows the entirety of the centerlink 39 to move through an arc with both the arc H and the arc J of the joints 21 and 22 being substantially equal as in the prior art embodiment illustrated in FIG. 1. The degree of curvature of the extension 38 which is required in any specific adaptation is dependent upon the degree of curvature of the arc A caused by the rotation of the pitman arm 12. It can thus be seen that the embodiment illustrated in FIG. 3 will produce parallel steering in the dirigible wheels attached to the joints 25 and 26, the same as the prior art linkage produces but without the use of an idler arm and the joints associated therewith.

FIG. 4 illustrates a modification of the centerlink extension 32 which provides an upset shoulder 40 on the extension 32 and a further upset shoulder or other stop 41 adjacent the end 42 of the centerlink extension 32. Although the stops are illustrated as being an upset shoulder 40 and a washer 41 retained by a bolt 43, it is to be understood that any other form of increased diameter or projecting stop can be utilized. In this manner, the lateral movement of the extension 32 is restricted to the distance between the stops 40 and 41 by the abutment of either of the stops with the bushing 35 or if of large enough diameter, with the bracket 36. This provides an effective and economical method of controlling the maximum degree to which the dirigible wheels of the vehicle may be turned to either side of the center point.

Although FIG. 4 illustrates the stops 40 and 41 in connection with the straight projecting extension 32 illustrated in FIG. 2, it is to be understood that the stops may also be provided with the curved centerlink extension 38 illustrated in FIG. 3.

It can therefore be seen from the above that my invention provides for a novel method of eliminating the need for an idler arm and associated joints in connection with steering linkages while retaining the basic design and function of the parallelogram type of steering linkage.

Although I have herein set forth my invention with respect to certain specific principles and details thereof, it will be understood that these may be varied without departing from the spirit and scope of the invention as set forth in the hereunto appended claims.

I claim as my invention:

1. In a centerlink type steering linkage having one end of the centerlink attached to and carried by a pitman arm and tie rods connecting the centerlink to dirigible wheels, the improvement of the other end of the said centerlink having an extension thereon and a bushing slidably supporting the extension, the said bushing anchored to the frame of a vehicle and the said extension pivotable in the bushing with respect thereto whereby the said extension and said bushing accommodate arcuate movement of the centerlink when the said pitman arm is rotated.

2. The linkage of claim 1 wherein the said extension is arcuately curved so as to provide equal arcuate movement at the points at which the tie rods contact the centerlink when the pitman arm is rotated.

3. A steering linkage comprising: a centerlink having a joint at one end thereof, an elongated extension at the other end thereof, tie rod joints attached to said centerlink intermediate the ends thereof, said joint adapted to be attached to a rotatable pitman arm to move said one end of said tie rod transversely and laterally, a slip bushing receiving said extension whereby when said one end is moved transversely and laterally by said pitman arm the said extension moves through the said bushing and the said centerlink moves through an arc, the said extension arcuately curved so as to provide equal arcuate movements at the points of said centerlink where said tie rods are attached.

4. A steering linkage comprising: a centerlink, a joint at one end therein adapted to be attached to and supported by a rotatable pitman arm, an elongated extension at the other end of the said center link, a slip bushing adapted to be attached to a vehicle in spaced relation from the pitman arm, said bushing adapted to receive said elongated extension therethrough, said bushing allowing pivoting of the said extension therein, increased diameter stops on the said extension axially spaced from each other adapted to restrict movement of the said extension through the said bushing to the area between the stops, and a plurality of tie rods attached to the said centerlink whereby the rotating movement of the said pitman arm is transferred to transverse-lateral arcuate movement of the said centerlink.

5. The linkage of claim 4 wherein the said extension is arcuately curved so as to provide substantially equal arcuate movement of the centerlink at the points of said centerlink where the said tie rods are attached.

References Cited

UNITED STATES PATENTS 2,676,663  4/1954  Smith _____ 280—95 X
2,761,694  9/1956  Graham _____ 280—95

KENNETH H. BETTS, Primary Examiner

UNITED STATES PATENT OFFICE
CERTIFICATE OF CORRECTION

Patent No. 3,525,533Dated August 25, 1970

Inventor(s) Sylvester S. Mazur

It is certified that error appears in the above-identified patent and that said Letters Patent are hereby corrected as shown below:

In the claims:

The following claim, No. 5 of the original specification, should be added to the printed patent as Claim 6. It was omitted by error of the Patent Office.

6. The steering linkage of claim 2 wherein the said extension has spaced-apart stops thereon adapted to engage the said bushing to restrict movement of the extension through the said bushing to the area between the stops.

In the heading to the printed specification, line 7, "5 Claims" should read -- 6 Claims --.

Signed and sealed this 30th day of March 1971.

(SEAL)
Attest:

EDWARD M. FLETCHER, JR.WILLIAM E. SCHUYLER, JR.
Attesting OfficerCommissioner of Patents